United States Patent
Kim et al.

(10) Patent No.: US 8,481,621 B2
(45) Date of Patent: *Jul. 9, 2013

(54) COMPOSITIONS COMPRISING AN AMINO TRIAZINE AND IONOMER OR IONOMER PRECURSOR

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,977

(22) Filed: Jul. 6, 2012

(65) Prior Publication Data

US 2012/0277031 A1    Nov. 1, 2012

Related U.S. Application Data

(63) Continuation of application No. 12/424,401, filed on Apr. 15, 2009, now Pat. No. 8,236,880.

(60) Provisional application No. 61/047,321, filed on Apr. 23, 2008.

(51) Int. Cl.
| | |
|---|---|
| C08K 5/3492 | (2006.01) |
| C08G 69/26 | (2006.01) |
| C08G 63/60 | (2006.01) |
| C08L 67/00 | (2006.01) |

(52) U.S. Cl.
USPC ........... 524/100; 524/599; 524/602; 524/606; 528/332; 528/342; 528/423; 473/371; 473/372

(58) Field of Classification Search
USPC ................. 524/100, 599, 602, 606; 528/332, 528/342, 423; 473/371, 372
See application file for complete search history.

(56) References Cited

U.S. PATENT DOCUMENTS

| | | | |
|---|---|---|---|
| 3,264,272 A | 8/1966 | Rees et al. |
| 3,492,245 A | 1/1970 | Calderon et al. |
| 3,804,803 A | 4/1974 | Streck et al. |
| 4,115,475 A | 9/1978 | Foy et al. |
| 4,195,015 A | 3/1980 | Deleens et al. |
| 4,230,838 A | 10/1980 | Foy et al. |
| 4,331,786 A | 5/1982 | Foy et al. |
| 4,332,920 A | 6/1982 | Foy et al. |
| 4,404,325 A | 9/1983 | Mason et al. |
| 4,839,441 A | 6/1989 | Cuzin et al. |
| 4,864,014 A | 9/1989 | Cuzin et al. |
| 4,894,411 A | 1/1990 | Okada et al. |
| 4,955,966 A | 9/1990 | Yuki et al. |
| 5,130,372 A | 7/1992 | Lences et al. |
| 5,150,905 A | 9/1992 | Yuki et al. |
| 5,385,776 A | 1/1995 | Maxfield et al. |
| 5,436,295 A | 7/1995 | Nishikawa et al. |
| 5,484,870 A | 1/1996 | Wu |
| 5,691,066 A | 11/1997 | Rajagopalan |
| 5,692,974 A | 12/1997 | Wu et al. |
| 5,886,103 A | 3/1999 | Bellinger et al. |
| 5,959,059 A | 9/1999 | Vedula et al. |
| 5,962,553 A | 10/1999 | Ellsworth |
| 5,985,370 A | 11/1999 | Ohira et al. |
| 6,012,991 A | 1/2000 | Kim et al. |
| 6,037,419 A | 3/2000 | Takesue et al. |
| 6,100,321 A | 8/2000 | Chen |
| 6,117,024 A | 9/2000 | Dewanjee |
| 6,142,887 A | 11/2000 | Sullivan et al. |
| 6,207,784 B1 | 3/2001 | Rajagopalan |
| 6,329,458 B1 | 12/2001 | Takesue et al. |
| 6,562,906 B2 | 5/2003 | Chen |
| 6,610,812 B1 | 8/2003 | Wu et al. |
| 6,616,552 B2 | 9/2003 | Takesue et al. |
| 6,653,403 B2 | 11/2003 | Dalton et al. |
| 6,719,646 B2 | 4/2004 | Calabria et al. |
| 6,762,273 B2 | 7/2004 | Dewanjee |
| 6,793,864 B1 | 9/2004 | Dewanjee et al. |
| 6,794,447 B1 | 9/2004 | Kim et al. |
| 6,903,178 B2 | 6/2005 | Wu et al. |
| 6,924,337 B2 | 8/2005 | Kim et al. |
| 6,930,150 B2 | 8/2005 | Kim |
| 6,951,519 B2 | 10/2005 | Dewanjee et al. |
| 7,208,546 B2 | 4/2007 | Rajagopalan et al. |
| 7,226,961 B2 | 6/2007 | Park et al. |
| 7,261,647 B2 | 8/2007 | Sullivan et al. |
| 7,314,896 B2 | 1/2008 | Rajagopalan et al. |
| 7,332,533 B2 | 2/2008 | Kim et al. |
| 7,767,759 B2 | 8/2010 | Kim et al. |
| 7,874,940 B2 | 1/2011 | Kim et al. |
| 7,878,926 B2 | 2/2011 | Kim et al. |
| 7,915,348 B2 | 3/2011 | Kim et al. |
| 8,177,665 B2 | 5/2012 | Loper et al. |
| 8,211,976 B2 | 7/2012 | Kim et al. |
| 2003/0158312 A1 | 8/2003 | Chen |
| 2004/0092336 A1 | 5/2004 | Kim et al. |
| 2004/0201133 A1 | 10/2004 | Dewanjee et al. |
| 2004/0236030 A1 | 11/2004 | Kim et al. |
| 2005/0261424 A1 | 11/2005 | Snell et al. |
| 2005/0288446 A1 | 12/2005 | Zieske et al. |
| 2006/0014898 A1 | 1/2006 | Kim et al. |
| 2006/0030427 A1 | 2/2006 | Kim et al. |
| 2006/0166761 A1 | 7/2006 | Kim et al. |
| 2006/0166762 A1 | 7/2006 | Kim et al. |

(Continued)

FOREIGN PATENT DOCUMENTS

| | | |
|---|---|---|
| WO | WO 96/40378 | 12/1996 |

*Primary Examiner* — Kriellion Sanders
(74) *Attorney, Agent, or Firm* — Klarquist Sparkman, LLP

(57) ABSTRACT

Disclosed embodiments concern using at least one triazine, typically an amine or polyamine triazine (referred to as amino triazines), in combination with at least one ionomer or ionomer precursor to form compositions useful for making sporting equipment, such as golf ball components. The ionomer or ionomer precursor typically includes plural acid functional groups, such as carboxyl or carboxylate groups, that react or form salts with the amino triazine. Specific examples, without limitation, of suitable amino triazines include guanamine, 6-methyl-1,3,5-triazine-2,4-diamine(acetoguanamine), 6-nonyl-1,3,5-triazine-2,4-diamine(nonylguanamine), 6-phenyl-1,3,5-triazine-2,4-diamine(benzoguanamine) and 2,4,6-triamino-triazine(melamine).

9 Claims, 2 Drawing Sheets

U.S. PATENT DOCUMENTS

| | | |
|---|---|---|
| 2006/0247074 A1 | 11/2006 | Kim et al. |
| 2007/0100085 A1 | 5/2007 | Kim et al. |
| 2007/0142568 A1 | 6/2007 | Kim et al. |
| 2007/0232756 A1 | 10/2007 | Kim et al. |
| 2007/0238552 A1 | 10/2007 | Kim et al. |
| 2008/0090678 A1 | 4/2008 | Kim et al. |
| 2008/0176677 A1 | 7/2008 | Snell et al. |
| 2008/0214326 A1 | 9/2008 | Kim et al. |
| 2008/0274825 A1 | 11/2008 | Kim et al. |
| 2009/0170634 A1 | 7/2009 | Loper et al. |
| 2009/0176601 A1 | 7/2009 | Snell et al. |
| 2010/0323818 A1 | 12/2010 | Kim et al. |
| 2011/0136588 A1 | 6/2011 | Kim et al. |

COMPOSITIONS COMPRISING AN AMINO TRIAZINE AND IONOMER OR IONOMER PRECURSOR

CROSS-REFERENCE TO RELATED APPLICATION

This is a continuation application of U.S. patent application Ser. No. 12/424,401, filed on Apr. 15, 2009, now U.S. Pat. No. 8,236,880, which claims the benefit of the earlier filing date of U.S. Provisional Application No. 61/047,321, which was filed on Apr. 23, 2008. The entire disclosures of these prior applications are considered to be part of the disclosure of the present disclosure and are incorporated herein by reference.

FIELD

The present disclosure concerns compositions comprising an ionomer or an ionomer precursor and an amino triazine, and sporting equipment such as golf balls, made using the compositions.

BACKGROUND

A. Golf Ball Construction and Composition

Modern golf balls generally comprise plural layers, including a core and at least one additional outer layer. Ball performance can be substantially modified by changing the ball construction and/or chemical composition of one or more golf ball components. Chemical composition can be modified to vary, for example, polymer hardness, compression, resilience and/or durability.

B. Ionomers and Patent Publications Describing Particular Ionomer Compositions for Making Golf Balls A number of issued United States patents disclose particular ionomer compositions ostensibly useful for making golf balls. Ionomers typically are copolymers that contain both nonionic repeat units and a small percentage, generally less than about 15%, of ion-containing repeat units. One example of an ionomer is the sodium or zinc salt of poly(ethylene-co-methacrylic acid), a copolymer derived from ethylene and methacrylic acid.

Non-polar chains of an ionomer group together, as do the polar ionic groups. As a result, ionomers have physical properties similar to crosslinked polymers or block copolymers, although ionomers are not crosslinked polymers in the traditional sense. When heated sufficiently to overcome the electrostatic forces that cause the ionic groups to cluster, ionomer polymer chains move more freely, resulting in a polymer having elastomeric properties and the processability of a thermoplastic. As a result, ionomeric polymers often are referred to as thermoplastic elastomers.

Ionomers initially were formed by fully or partially neutralizing carboxyl functional groups with metal cations. This method is exemplified by Yuki et al., U.S. Pat. No. 4,955,966, "Rubber Composition and Golf Ball Comprising It." A brief historical review of the subsequent development of ionomers for use in golf balls is provided by Rajagopalan, U.S. Pat. No. 5,691,066, "Golf Ball Comprising Fluoropolymer and Method of Making Same," and Dalton et al., U.S. Pat. No. 6,653,403, "Golf Balls Having a Cover Layer Formed from an Ionomer and Metallocene-Catalyzed Polyolefin Blend and Methods of Making Same."

C. Patent Publications Describing Particular Compositions Comprising Amine Compounds Useful for Making Golf Balls Particular amines, generally polyamines having two or more amine functional groups, have been used in compositions for making golf balls. For example, U.S. Pat. No. 5,484,870, entitled "Polyurea Composition Suitable for a Golf Ball Cover," discloses reacting particular organic isocyanates with particular diamines, such as the following compound.

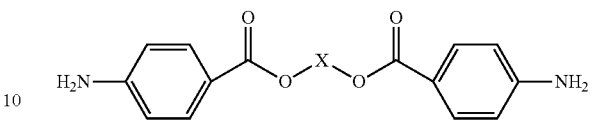

Certain patents discuss using melamine, often melamine-formaldehyde polymers, for making certain golf ball components, including U.S. Pat. Nos. 5,150,905, 5,985,370, 6,142,887, 7,208,546, 7,226,961, 7,261,647, and 7,314,896. The chemical structure for melamine is shown below.

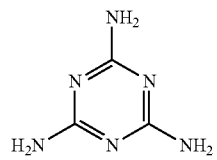

Taylor Made Golf Company, Inc. (Taylor Made), the assignee of the present application, also has filed applications directed to compositions comprising ionomers and amine compounds that are useful for making golf balls. See, for example, U.S. patent application Ser. No. 10/845,3370, which published on Nov. 25, 2004, as US/2004/0236030-A1, and U.S. patent application Ser. No. 11/685,335, which published on Oct. 4, 2007, as US/2007/0232756-A1, both of which are incorporated herein by reference.

SUMMARY

Certain disclosed embodiments concern using at least one triazine, typically an amine or polyamine triazine (referred to as amino triazines), such as guanamines and guanamine derivatives, in combination with at least one ionomer or ionomer precursor to form compositions useful for making sporting equipment. Certain disclosed compositions comprise a fully neutralized, partially neutralized or non-neutralized ionomer or ionomer precursor and an effective amount of the amino triazine. Prior to any reaction with the ionomer or ionomer precursor, the amino triazine has a formula

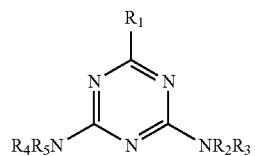

where $R_1$-$R_5$ are independently aliphatic, substituted aliphatic, amine, aryl, substituted aryl, heteroaryl, substituted heteroaryl groups, hydrogen or halogen, more particularly hydrogen, lower alkyl or phenyl. The ionomer or ionomer precursor may be partially or fully neutralized by a neutralizing species, such as an acetate, oxide or hydroxide metal salt, where the metal of the hydroxide metal salt is selected from Group IA, IB, IIA, IIB, IIIA, IIIB, IVA, IVB, VA, VB, VIIA, VIIB, VIIB, VIIIB metal cations, or combinations thereof, with particular exemplary metals including lithium, calcium, zinc, sodium, potassium, magnesium, nickel, manganese, or combinations thereof. Where $R_1$ is aryl or substituted aryl, additional exemplary amino triazines have a formula

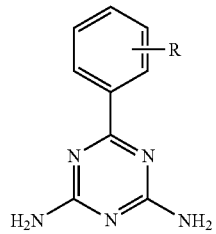

where R substituents are independently amine, aliphatic, substituted aliphatic, aryl, substituted aryl, heteroaryl, substituted heteroaryl, halogen, or hydrogen. Specific amino triazines useful for making sports equipment include, but are not limited to, guanamine, 6-methyl-1,3,5-triazine-2,4-diamine (acetoguanamine), 6-nonyl-1,3,5-triazine-2,4-diamine(nonylguanamine), or 6-phenyl-1,3,5-triazine-2,4-diamine (benzoguanamine), or 2,4,6-triamino-triazine (melamine).

The ionomer or ionomer precursor typically has plural reactive functional groups. These functional groups most typically are an oxo acid of carbon, an oxo acid of sulfur, an oxo acid of phosphorous, or combinations thereof. Typically, from about 5% to about 100% of the reactive functional groups react with the amino triazine compound. Thus, with reference to oxo acids of carbon to exemplify the invention, subsequent to reaction the compound may have a formula

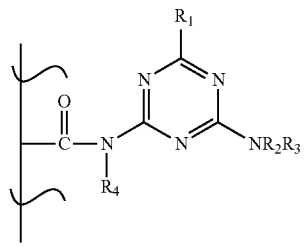

and/or form a salt compound having a formula

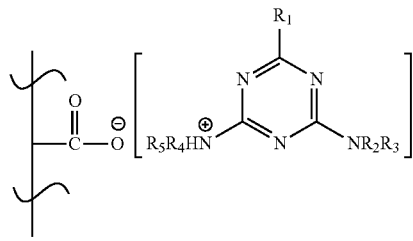

where $R_1$-$R_5$ are independently amine, aliphatic, substituted aliphatic, aryl, substituted aryl, heteroaryl, substituted heteroaryl, hydrogen or halogen. Moreover, subsequent to reaction, the compound also may have a formula

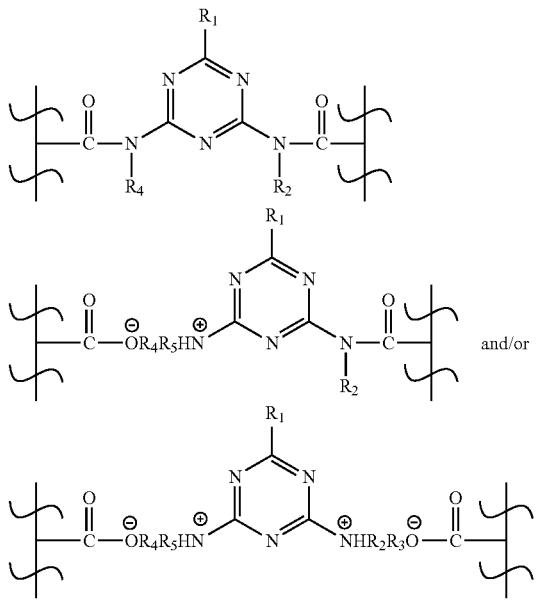

where $R_1$-$R_5$ are independently amine, aliphatic, substituted aliphatic, aryl, substituted aryl, heteroaryl, substituted heteroaryl, hydrogen or halogen.

Certain embodiments concern using disclosed ionomer or ionomer precursor compositions comprising amino triazines, including melamine, for making golf balls. Melamine has been used in certain golf ball applications. "Melamine" has been widely used to describe the thermoset melamine "resin," and not the chemical itself. As far as applicants are aware, melamine has never been used for reinforcing ionomeric resins for golf ball applications.

A person of ordinary skill in the art will appreciate that sports equipment, including golf balls or golf ball components, can have a material or materials in addition to the ionomer or ionomer precursor/amino triazine composition. Likewise, a person of ordinary skill in the art will appreciate that other components of the sports equipment need not include the ionomer or ionomer precursor/amino triazine composition, and may include any material or materials now known or hereafter developed useful for making desired sports equipment. Accordingly, disclosed embodiments of sports equipment, particularly exemplified by golf balls, may further comprise from greater than zero to about 99 weight percent of an additional polymeric material selected from synthetic and natural rubbers, thermoset polyurethanes and thermoset polyureas, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated polyolefins, halogenated polyethylenes, polyphenylene oxide, polyphenylene sulfide, diallyl phthalate polymer, polyimides, polyvinyl chloride, polyamide-ionomer, polyurethane-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, a compound having a general formula $(R_2N)_m—R'—(X(O)_nOR_y)_m$, wherein R is selected from the group consisting of hydrogen, one or more $C_1$-$C_{20}$ aliphatic systems, one or more cycloaliphatic systems, one or more aromatic systems, R' is a bridging group comprising one or more unsubstituted $C_1$-$C_{20}$ straight chain or branched aliphatic or alicyclic groups, one or more substituted straight chain or branched aliphatic or alicyclic groups, one or more aromatic groups, one or more oligomers each containing up to 12 repeating units, and when X is C or S or P, m is 1-3, when X=C, n=1 and y=1, when X=S, n=2 and y=1, and when X=P, n=2 and y=2, and any and all combinations of such materials.

Additional exemplary materials that can be added to sports equipment, such as golf balls or golf ball components, include fillers, nanofillers, antioxidants, colorants, dispersants, mold release agents, optical brighteners, photostabilizers, pigments, plasticizers, processing aids, and any and all combinations thereof. Exemplary fillers include, but are not limited to, precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, calcium carbonate, magnesium carbonate, barium carbonate, calcium sulfate, magnesium sulfate, barium sulfate, tungsten, steel, copper, cobalt, iron, tungsten carbide, metal oxides, metal stearates, and combinations thereof.

Modern golf balls typically have plural components or layers. For instance, certain disclosed golf balls comprise a three-piece golf ball having a rubber-based core, at least one intermediate layer and an outer cover layer. At least one of the intermediate layer and outer cover layer include the ionomer or ionomer precursor/amino triazine composition. Four-piece golf balls also are described, where such balls have a rubber-based core having a center, an inner intermediate layer, an outer intermediate layer, and a cover. Again, at least one of the inner layer, outer intermediate layer or cover includes the ionomer or ionomer precursor/amino triazine composition. Golf balls having even more layers are contemplated, such as a golf ball having a core, an inner mantle layer, an intermediate mantle layer, an outer mantle layer, and at least one cover layer, at least the core or one of such layers comprising the composition. For certain disclosed golf ball embodiments according to the present invention, an inner mantle layer, an intermediate mantle layer, and/or the outer mantle layer may each individually comprise a unimodal ionomer; a bimodal ionomer; a modified unimodal ionomer; a modified bimodal ionomer; a thermoset polyurethane; a thermoset polyurea; a polyester elastomer; a copolymer comprising at least one first co-monomer selected from butadiene, isoprene, ethylene or butylene and at least one second co-monomer selected from a (meth)acrylate or a vinyl arylene; a polyalkenamer; or any and all combinations or mixtures thereof. Cover layers typically comprise a polyurethane, a polyurea, or a combination or mixture thereof.

Each component of a golf ball has a particular hardness, typically measured as a Shore D hardness. For example, for certain disclosed embodiments of the present invention the core and each subsequent layer has a Shore D hardness that increases from the core to the outer mantle layer.

The foregoing and other objects, features, and advantages of the invention will become more apparent from the following detailed description, which proceeds with reference to the accompanying figures.

DETAILED DESCRIPTION

I. Introduction and Definitions

Figure 1:
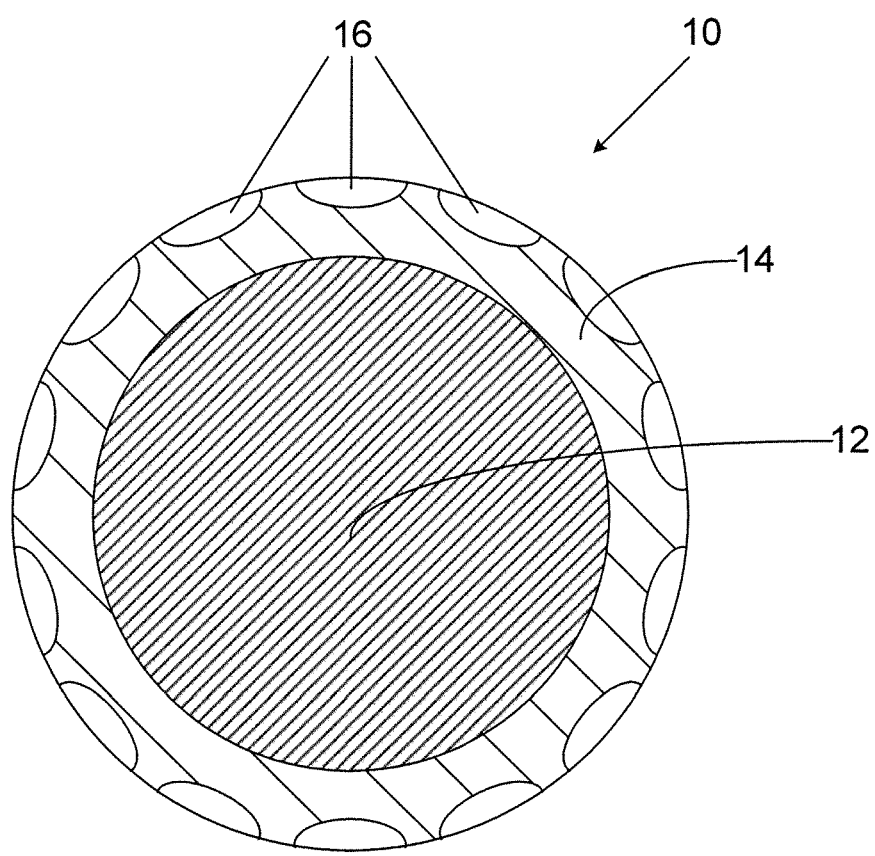
FIG. 1 is a schematic cross section of a two-piece golf ball.

The following definitions, presented in alphabetical order, are provided to aid the reader, and are not intended to provide term definitions that would be narrower than would be understood by a person of ordinary skill in the art of golf ball composition and manufacture.

Any numerical values recited herein include all values from the lower value to the upper value. All possible combinations of numerical values between the lowest value and the highest value enumerated herein are expressly included in this application.

The terms "aryl" and "heteroaryl" as used herein refer to any aryl group, which optionally can be substituted, or any "heteroaryl" group, which also optionally can be substituted, and includes, by way of example and without limitation, phenyl, biphenyl, indenyl, naphthyl (1-naphthyl, 2-naphthyl), N-hydroxytetrazolyl, N-hydroxytriazolyl, N-hydroxyimidazolyl, anthracenyl (1-anthracenyl, 2-anthracenyl, 3-anthracenyl), thiophenyl (2-thienyl, 3-thienyl), furyl (4-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl (3-pyrazolyl), imidazolyl (1-imidazolyl, 2-imidazolyl, 4-imidazolyl, 5-imidazolyl), triazolyl (1,2,3-triazol-1-yl, 1,2,3-triazol-2-yl 1,2,3-triazol-4-yl, 1,2,4-triazol-3-yl), oxazolyl (2-oxazolyl, 4-oxazolyl, 5-oxazolyl), thiazolyl (2-thiazolyl, 4-thiazolyl, 5-thiazolyl), pyridyl (2-pyridyl, 3-pyridyl, 4-pyridyl), pyrimidinyl (2-pyrimidinyl, 4-pyrimidinyl, 5-pyrimidinyl, 6-pyrimidinyl), pyrazinyl, pyridazinyl (3-pyridazinyl, 4-pyridazinyl, 5-pyridazinyl), quinolyl (2-quinolyl, 3-quinolyl, 4-quinolyl, 5-quinolyl, 6-quinolyl, 7-quinolyl, 8-quinolyl), isoquinolyl (1-isoquinolyl, 3-isoquinolyl, 4-isoquinolyl, 5-isoquinolyl, 6-isoquinolyl, 7-isoquinolyl, 8-isoquinolyl), benzo[b]furanyl (2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl (2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl (2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl, 5-(2,3-dihydro-benzo[b]thiophenyl), 6-(2,3-dihydro-benzo[b]thiophenyl), 7-(2,3-dihydro-benzo[b]thiophenyl), indolyl (1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl (1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl (1-benzothiazolyl, 2-benzothiazolyl, 4-benzothiazolyl, 5-benzothiazolyl, 6-benzothiazolyl, 7-benzothiazolyl), carbazolyl (1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl, 10,11-dihydro-5H-dibenz[b,f]azepine (10,11-dihydro-5H-dibenz[b,f]azepine-1-yl, 10,11-dihydro-5H-dibenz[b,f]azepine-2-yl.

The term "bimodal polymer" refers to a polymer comprising two main fractions and more specifically to the form of the polymer's molecular weight distribution curve, i.e., the appearance of the graph of the polymer weight fraction as a function of its molecular weight. When the molecular weight distribution curves from these fractions are superimposed onto the molecular weight distribution curve for the total resulting polymer product, that curve will show two maxima or at least be distinctly broadened in comparison with the curves for the individual fractions. Such a polymer product is called bimodal. The chemical compositions of the two fractions may be the same or may be different.

"Conjugated" refers to an organic compound containing two or more sites of unsaturation (e.g., carbon-carbon double bonds, carbon-carbon triple bonds, and sites of unsaturation comprising atoms other than carbon, such as nitrogen) separated by a single bond.

As used herein, the term "core" is intended to mean the elastic center of a golf ball, which may have a unitary construction. Alternatively the core itself may have a layered construction, e.g. having a spherical "center" and additional "core layers," with such layers being made of the same material or a different material from the core center.

The term "cover" is meant to include any layer of a golf ball that surrounds the core. Thus a golf ball cover may include both the outermost layer and also any intermediate layers, which are disposed between the golf ball center and outer cover layer. "Cover" may be used interchangeably with the term "cover layer". Depending on context, "cover" also may refer to the outer most layer of the golf ball.

"Effective amount" is an amount of a reagent added to achieve a particular result, such as to react with at least a portion of reactive functional groups that are available for reaction with the reagent. For example, and with reference to an amino triazine compound, an effective amount is an amount of the amino triazine compound effective to form a salt, or otherwise react with, at least a portion of available acid functional groups, such as carboxyl/carboxylate groups and/or isocyanate groups, or functional groups equivalent thereto or derived therefrom. While a person of ordinary skill in the art will appreciate that this amount can vary, an effective amount for disclosed embodiments of the present invention typically refers to an amount greater than 0 part to about 30 parts, more typically from about 0.1 to about 15 parts, by weight of the amino triazine compound per weight of the monomer, oligomer or polymer with which it is combined.

A "fiber" is a general term and the definition provided by Engineered Materials Handbook, Vol. 2, "Engineering Plastics", published by A.S.M. International, Metals Park, Ohio, USA, is relied upon to refer to filamentary materials with a finite length that is at least 100 times its diameter, which typically is 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned also are considered to be encompassed by the invention. Thus, the terms "fibers" and "fiber segments" are used herein. "Fibers or fiber segments" and "fiber elements" are used to encompass both fibers and fiber segments. Embodiments of the golf ball components described herein may include fibers including, by way of example and without limitation, glass fibers, such as E fibers, Cem-Fil filament fibers, and 204 filament strand fibers; carbon fibers, such as graphite fibers, high modulus carbon fibers, and high strength carbon fibers; asbestos fibers, such as chrysotile and crocidolite; cellulose fibers; aramid fibers, such as Kevlar, including types PRD 29 and PRD 49; and metallic fibers, such as copper, high tensile steel, and stainless steel. In addition, single crystal fibers, potassium titanate fibers, calcium sulphate fibers, and fibers or filaments of one or more linear synthetic polymers, such as Terylene, Dacron, Perlon, Orion, Nylon, including Nylon type 242, are contemplated. Polypropylene fibers, including monofilament and fibrillated fibers are also contemplated. Golf balls according to the present invention also can include any combination of such fibers. Fibers used in golf ball components are described more fully in Kim et al. U.S. Pat. No. 6,012,991, which is incorporated herein by reference.

The term "fully-interpenetrating network" refers to a network that includes two independent polymer components that penetrate each other, but are not covalently bonded to each other.

In the case of a ball with two intermediate layers, the term "inner intermediate layer" may be used interchangeably herein with the terms "inner mantle" or "inner mantle layer" and is intended to mean the intermediate layer of the ball positioned nearest to the core.

The term "intermediate layer" may be used interchangeably with "mantle layer," "inner cover layer" or "inner cover" and is intended to mean any layer(s) in a golf ball disposed between the core and the outer cover layer.

The term "lower alkyl" refers to hydrocarbon chains having 10 or fewer carbon atoms, including all positional, geometric and stereoisomers thereof, including methyl, ethyl, propyl, butyl, pentyl, hexyl, heptyl, octyl, nonyl and decyl moieties.

The term "(meth)acrylate" is intended to mean an ester of methacrylic acid and/or acrylic acid.

The term "(meth)acrylic acid copolymers" is intended to mean copolymers of methacrylic acid and/or acrylic acid.

A "nanocomposite" is defined as a polymer matrix having nanofiller within the matrix. Nanocomposite materials and golf balls made comprising nanocomposite materials are disclosed in Kim et al., U.S. Pat. No. 6,794,447, and U.S. Pat. Nos. 5,962,553 to Ellsworth, 5,385,776 to Maxfield et al., and 4,894,411 to Okada et al., which are incorporated herein by reference in their entirety. Inorganic nanofiller materials generally are made from clay, and may be coated by a suitable compatibilizing agent, as discussed below in further detail. The compatibilizing agent allows for superior linkage between inorganic and organic material, and it also can account for the hydrophilic nature of the inorganic nanofiller material and the possibly hydrophobic nature of the polymer. Nanofiller particles typically, but not necessarily, are approximately 1 nanometer (nm) thick and from about 100 to about 1,000 nm across, and hence have extremely high surface area, resulting in high reinforcement efficiency to the material at low particle loading levels. The sub-micron-sized particles enhance material properties, such as the stiffness of the material, without increasing its weight or opacity and without reducing the material's low-temperature toughness. Materials incorporating nanofiller materials can provide these property improvements at much lower densities than those incorporating conventional fillers.

Nanofillers can disperse within a polymer matrix in three ways. The nanofiller may stay undispersed within the polymer matrix. Undispersed nanofillers maintain platelet aggregates within the polymer matrix and have limited interaction with the polymer matrix. As the nanofiller disperses into the polymer matrix, the polymer chains penetrate into and separate the platelets. When viewed by transmission electron microscopy or x-ray diffraction, the platelet aggregates are expanded relative to undispersed nanofiller. Nanofillers at this dispersion level are referred to as being intercalated. A fully dispersed nanofiller is said to be exfoliated. An exfoliated nanofiller has the platelets fully dispersed throughout the polymer matrix; the platelets may be dispersed unevenly but preferably are dispersed substantially evenly.

Nanocomposite materials are materials incorporating from about 0.1% to about 20%, preferably from about 0.1% to about 15%, and most preferably from about 0.1% to about 10% nanofiller potentially reacted into and preferably substantially evenly dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer. When used in the manufacture of golf balls, nanocomposite materials can be blended effectively into ball compositions at a typical weight percentage, without limitation, of from about 1% to about 50% of the total composition used to make a golf ball component, such as a cover or core, by weight.

"Sports equipment" includes, but is not limited to, shoes for all sports, such as golf, soccer, football, tennis, bowling, baseball, basketball, field hockey, ice hockey, lacrosse, skiing, snow boarding, skating, skate boarding, and cycling. "Sports equipment" also includes devices used for all such sports, such as golf balls, golf clubs, golf club heads, bats, hockey and lacrosse sticks, skis, snow boards, bicycle components, skate components, and skate boards and components thereof.

The term "outer cover layer" is intended to mean the outermost cover layer of the golf ball on which, for example, the dimple pattern, paint and any writing, symbol, etc. is placed. If, in addition to the core, a golf ball comprises two or more cover layers, only the outermost layer is designated the outer cover layer. The remaining layers may be designated intermediate layers. The term outer cover layer is interchangeable with the term "outer cover".

In the case of a ball with two intermediate layers, the term "outer intermediate layer" may be used interchangeably herein with the terms "outer mantle" or "outer mantle layer" and is intended to mean the intermediate layer of the ball which is disposed nearest to the outer cover layer.

"Peptizers" are chemical(s) or compositions that inhibit polymer cross-linking, most typically cross-linking of unsaturated polymers, but which can participate in polymer cross-linking after cross-linking is initiated.

The term "polyalkenamer" is used interchangeably herein with the term "polyalkenamer rubber" and means a polymer of one or more alkenes, including cycloalkenes, having from 5-20, preferably 5-15, most preferably 5-12 ring carbon atoms. The polyalkenamers may be prepared by any suitable method including ring opening metathesis polymerization of one or more cycloalkenes in the presence of organometallic catalysts as described in U.S. Pat. Nos. 3,492,245, and 3,804,803, the entire contents of both of which are incorporated herein by reference.

"Polymer precursor material" refers to any material that can be further processed to form a final polymer material of a manufactured golf ball, such as, by way of example and not limitation, monomers that can be polymerized, or a polymerized or partially polymerized material that can undergo additional processing, such as crosslinking.

The term "pseudo-crosslinked network" refers to materials that have crosslinking, but, unlike chemically vulcanized elastomers, pseudo-crosslinked networks are formed in-situ, not by covalent bonds, but instead by ionic clustering of the reacted functional groups, which clustering may disassociate at elevated temperatures.

The term "semi-interpenetrating network" refers to a network that includes at least one polymer component that is linear or branched and interspersed in the network structure of at least one of the other polymer components.

A "thermoplastic material" is generally defined as a material that is capable of softening or fusing when heated and of hardening again when cooled.

A "thermoset material" is generally defined as a material that crosslinks or cures via interaction with a crosslinking or curing agent. Crosslinking also may be induced by energy, such as in the form of heat (generally above 200° C.), through a chemical reaction (by reaction with a curing agent), or by irradiation. The resulting composition remains rigid when set, and does not soften with heating.

The term "unimodal polymer" refers to a polymer comprising one main fraction and more specifically to the form of the polymer's molecular weight distribution curve, i.e., the molecular weight distribution curve for the total polymer product shows only a single maximum.

II. Golf Ball Composition and Construction

FIG. 1 illustrates a two-piece golf ball 10 comprising a solid center or core 12, and an outer cover layer 14. Golf balls also typically include plural dimples 16 formed in the outer cover and arranged in various desired patterns.

Figure 2:
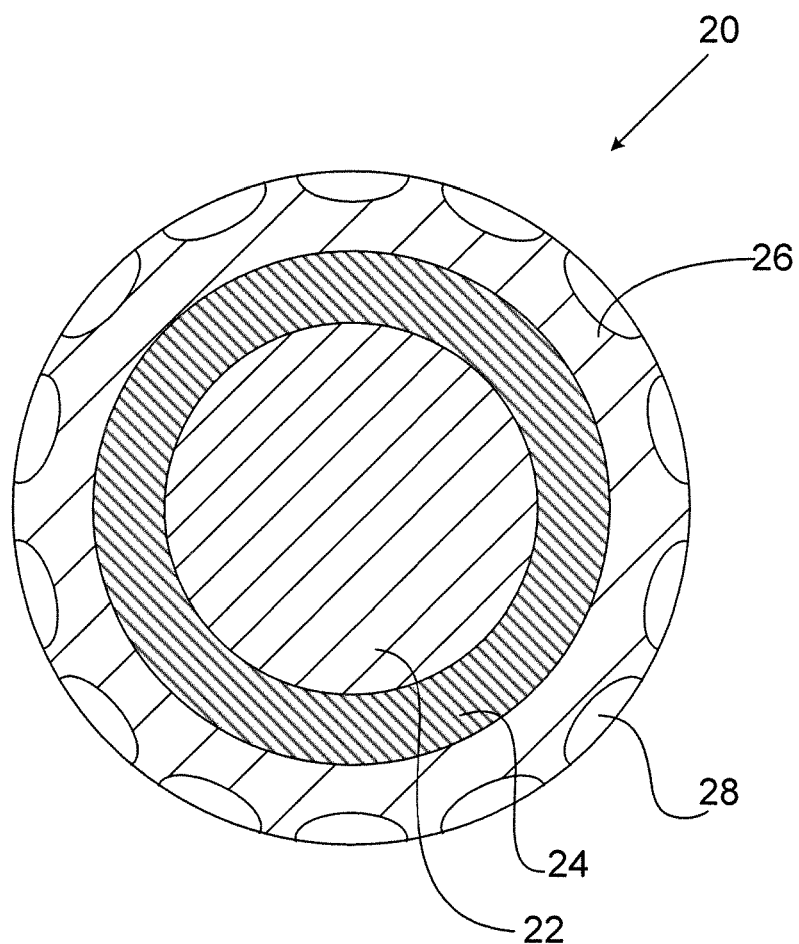
FIG. 2 is a schematic cross section of a three-piece golf ball.

FIG. 2 illustrates a 3-piece golf ball 20 comprising a core 22, an intermediate layer 24 and an outer cover layer 26. Golf ball 20 also typically includes plural dimples 28 formed in the outer cover layer 26 and arranged in various desired patterns. Although FIGS. 1 and 2 illustrate only two- and three-piece golf ball constructions, golf balls of the present invention may comprise from 0 to at least 5 intermediate layer(s), preferably from 0 to 3 intermediate layer(s), more preferably from 1 to 3 intermediate layer(s), and most preferably 1 to 2 intermediate layer(s).

The present invention can be used to form golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. Oversize golf balls with diameters above about 1.760 inches to as big as 2.75 inches also are within the scope of the invention.

A. Core

Ball cores of the present invention have a diameter of from about 0.5 to about 1.62 inches, preferably from about 0.7 to about 1.60 inches, and more preferably from about 1 to about 1.58 inches.

In another preferred embodiment, the golf ball core has at least one core layer on the center core, the layer having a thickness of from about 0.01 inch to about 1.14 inches, preferably from about 0.02 inch to about 1.12 inches, more preferably from about 0.03 inch to about 1.10 inches and most preferably from about 0.04 inch to about 1 inch.

In still another embodiment, two-piece balls are disclosed comprising a core and a cover having a thickness of from about 0.01 to about 0.20 inch, preferably from about 0.02 to about 0.15 inch, more preferably from about 0.03 to about 0.10 inch and most preferably from about 0.03 to about 0.07 inch. The cover typically has a hardness greater than about 25, preferably greater than about 30, and typically greater than about 40 Shore D. The ball typically has a PGA ball compression greater than about 40, preferably greater than 50, more preferably greater than about 60, most preferably greater than about 70.

The golf ball cores of the present invention typically have a PGA compression of less than about 110, preferably less than about 100, more preferably less than about 90, and most preferably less than about 80.

The Shore D hardness of the core center and core layers made according to the present invention may vary from about 10 to about 90, typically from about 20 to about 80, and even more typically from about 30 to about 70.

The various core layers (including the center) each may have a different hardness. The difference between the center hardness and that of the next adjacent layer, as well as the difference in hardness between the various core layers typically is greater than 2, more typically greater than 5, and even more typically greater than 10 units of Shore D.

In one disclosed embodiment, the hardness of the center and each sequential layer increases progressively outwards from the center to outer core layer.

In another disclosed embodiment, the hardness of the center and each sequential layer decreases progressively inwards from the outer core layer to the center."

B. Intermediate Layer(s) and Cover Layer

In one preferred embodiment, the golf ball of the present invention is a multi-piece ball having at least one layer comprising an ionomer composition as disclosed herein.

In another preferred embodiment, the golf ball of the present invention is a three-piece ball having a core and/or at least one layer comprising an ionomer composition as disclosed herein.

In yet another preferred embodiment of the present invention, the golf ball of the present invention is a four-piece ball having a core and/or at least one layer comprising an ionomer composition as disclosed herein.

The one or more intermediate layers of the golf balls of the present invention has a thickness of from about 0.01 to about 0.20 inch, preferably from about 0.02 to about 0.15 inch, more preferably from about 0.03 to about 0.10 inch and most preferably from about 0.03 to about 0.06 inch.

The one or more intermediate layers of the golf balls of the present invention also has a Shore D hardness greater than about 20, preferably greater than about 30, and typically greater than about 40.

The one or more intermediate layers of the golf balls of the present invention also has a flexural modulus from about 5 to about 500 kpsi, preferably from about 10 to about 300 kpsi, more preferably from about 15 to about 200 kpsi, and most preferably from about 20 to about 100 kpsi.

The cover layer of the balls of the present invention has a thickness of from about 0.01 to about 0.10 inch, preferably from about 0.02 to about 0.08 inch, more preferably from about 0.03 to about 0.07 inch.

The cover layer of the balls of the present invention has a Shore D hardness of from about 30 to about 75, preferably from about 30 to about 70, more preferably from about 45 to about 65.

The coefficient of restitution (COR) is an important physical attribute of golf balls. The coefficient of restitution is the ratio of the relative velocity between two objects after direct impact to the relative velocity before impact. As a result, the COR can vary from 0 to 1, with 1 being a perfectly or completely elastic collision and 0 being a perfectly or completely inelastic collision. Since the COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/sec to 180 ft/sec. As the ball travels toward the steel plate, it activates each light screen so that the time at each light screen is measured. This provides an incoming time period proportional to the ball's incoming velocity. The ball impacts the steel plate and rebounds through the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

The COR depends on the golf ball construction as well as the chemical composition of the various layers. Peptizers are added to polymeric compositions, particularly compositions comprising unsaturated polymers, to desirably affect one or more physical properties of such compositions while substantially maintaining COR values. The ability to maintain COR allows golf ball performance to be maintained while allowing for additional adjustments in ball layer material properties.

III. Ionomers and Ionomer Precursor Compounds

Disclosed embodiments of the present invention concern ionomer or ionomer precursor compounds and compositions comprising such compounds that are useful for making sporting equipment, such as golf balls. Accordingly, at least one component of disclosed golf ball embodiments comprises one or more ionomer resins. Ionomers can be prepared according to methods known in the art. See, for example, U.S. Pat. No. 3,264,272, incorporated herein by reference.

Alternatively, many ionomeric materials are commercially available. One family of such resins was developed in the mid-1960's, by E.I. DuPont de Nemours and Co., and sold under the trademark SURLYN®. Generally speaking, most commercial ionomers are unimodal and consist of a polymer of (1) a mono-olefin, e.g., an alkene, with (2) an unsaturated compound comprising plural acid functional groups, such as an oxo acid of carbon (i.e., a carboxylate), an oxo acid of sulfur, an oxo acid of phosphorous, or combinations thereof, with carboxylate being a currently preferred anionic functional group, such as such as mono- or dicarboxylic acids, having 3 to 12 carbon atoms. The incorporated acid functional groups, such as the carboxylic acid groups, are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of, for example, formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid. As a general rule, the hardness of these materials increases with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 weight percent to about 35 weight percent in the polymer. Generally, such a high acid ionomer will have a flexural modulus from about 50,000 psi to about 125,000 psi.

An additional monomer, typically a mono- or dicarboxylic acid ester, also may be incorporated into the formulation as a so-called "softening comonomer". Softening comonomers typically are used in amounts of from about 10 weight percent to about 50 weight percent in the polymer. Ionomer resins comprising softening comonomers typically have a flexural modulus of from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Currently there are commercially available ionomer resins based both on copolymers of ethylene and (meth)acrylic acid or terpolymers of ethylene and (meth)acrylic acid and (meth) acrylate that can be used for making golf ball components. The properties of these ionomer resins can vary widely due to variations in acid content, softening comonomer content, the degree of neutralization, and the type of metal ion used in the neutralization. The full range of commercially available compounds typically includes ionomer compositions having a general formula, E/X/Y. With reference to this general formula, E is ethylene. X is a $C_3$ to $C_8$ $\alpha,\beta$-ethylenically unsaturated carboxylic acid, such as acrylic or methacrylic acid, and is present in an amount from about 2 to about 30 weight percent of the E/X/Y copolymer. Y is a softening comonomer selected from alkyl acrylate and alkyl methacrylate, such as methyl acrylate or methyl methacrylate, wherein the alkyl groups have from about 1 to about 8 carbon atoms. Y is in the range of 0 to about 50 weight percent of the E/X/Y copolymer. About 1% to about 90% of the acid moieties typically are neutralized from to form an ionomer with a cation such as lithium, sodium, potassium, magnesium, calcium, barium, lead, tin, zinc or aluminum, or a combination of such cations.

The ionomer also may be a so-called bimodal ionomer as described in U.S. Pat. No. 6,562,906, which is incorporated herein by reference. Bimodal ionomers are prepared from blends comprising polymers of different molecular weights. Specifically they include bimodal polymer blend compositions comprising:

a high molecular weight component having molecular weight of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, potassium, zinc, calcium, magnesium, and a mixture of any these; and a low molecular weight component having a molecular weight of from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, potassium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are incorporated herein by reference.

The modified unimodal ionomers are prepared by mixing:
an ionomeric polymer comprising ethylene, from 5 to 25 weight percent (meth)acrylic acid, and from 0 to 40 weight percent of a (meth)acrylate monomer, the ionomeric polymer neutralized with metal ions selected from the group consisting of lithium, sodium, potassium, zinc, calcium, magnesium, and a mixture of any these, and from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing:

a. a high molecular weight component having molecular weight of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, zinc, calcium, potassium, magnesium, and a mixture of any of these;

b. a low molecular weight component having a molecular weight of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, zinc, calcium, potassium, magnesium, and a mixture of any of these; and c. from about 5 to about 40 weight percent (based on the total weight of said modified ionomeric polymer) of one or more fatty acids or metal salts of the fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3 (CH_2)_X COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to, stearic acid ($C_{18}$, i.e., $CH_3 (CH_2)_{16} COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{18}$, i.e., $CH_3(CH_2)_7CH:CH(CH_2)_7COOH$).

The source of the metal ions used to produce the metal salts of the fatty or waxy acid salts used in the various modified ionomers are generally various metal salts, which provide the metal ions capable of neutralizing, to various extents, the carboxylic acid groups of the fatty acids. These include the sulfate, carbonate, acetate and hydroxylate salts of zinc, sodium, lithium, potassium, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of the fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

A first composition comprising an ionomeric reaction product can be combined with at least one additional polymer or polymer precursor, to form a second composition. Certain embodiments of such compositions are particularly designed for making golf balls where at least one layer, and perhaps plural golf ball layers, include the ionomeric reaction product composition.

Ionomer compositions disclosed herein also can be combined with one or more additional materials, now known or hereafter developed, useful for making sports equipment, such as golf balls. A partial list of such material includes, without limitation, a UV stabilizer; a photostabilizer; a photoinitiator; a co-initiator; an antioxidant; a colorant; a dispersant; a mold release agent; a processing aid; a fiber; a filler, such as a density adjusting filler, a nano-filler, an inorganic filler, and/or an organic filler; and any and all combinations thereof.

Disclosed embodiments of the present invention may include selecting a suitable first composition comprising an ionomer or ionomer precursor composition comprising a monomer, oligomer, other polymer precursor, or polymer, and having at least one, and typically plural, acid functional groups, such as carboxylic acid groups, or functional groups equivalent thereto, such as carboxylate groups, esters, protecting-group protected carboxyl functional groups, etc. The carboxyl group content of such compounds can vary, but typically is greater than about 20%, more typically greater than about 25%, even more typically from about 25% to about 35%, and preferably from about 29% to about 34%. Useful carboxyl/carboxylate containing compounds include aliphatic, arylaliphatic, alicyclic and aromatic compounds. The schemes provided herein to exemplify disclosed embodiments typically illustrate compounds having at least one, and typically plural, carboxyl/carboxylate groups, or functional groups equivalent thereto, as being aliphatic compounds. A person of ordinary skill in the art will appreciate that the invention is not limited to using compounds comprising carboxyl/carboxylate groups, nor is it limited to aliphatic compounds, but instead can include arylaliphatic, alicyclic and aromatic compounds as well.

Certain useful ionomer or ionomer precursor compositions comprising a monomer, oligomer, other polymer precursor, or polymer are copolymers of olefin-unsaturated compounds. These olefin-unsaturated compounds may have varying numbers of carbon atoms, but typically have at least 2 carbons and generally not more than 10 carbon atoms, most typically not more than 8 carbon atoms, and preferably not more than 6 carbon atoms. Illustrative examples include alkylene-group-containing compounds, such as ethylene, propylene, butene, pentene, hexene, heptene and octane, with ethylene being a preferred compound. Thus, particular embodiments include copolymers of ethylene and a carboxylic acid, most typically an α,β-unsaturated carboxylic acid.

Alternatively, the ionomer or ionomer precursor compositions comprising a monomer, oligomer, other polymer precursor, or polymer may be a terpolymer of alkylene-group-containing compounds. For example, it may be a terpolymer of ethylene, and a carboxylic acid, or equivalent functional group, such as an ester or protecting-group protected carboxylic acid, most typically an α,β-unsaturated carboxylic acid or α,β-unsaturated carboxylic acid ester.

Examples of suitable α,β-unsaturated carboxylic acids include, but are not limited to, acrylic acid, methacrylic acid, fumaric acid, maleic acid, crotonic acid and the like, with preferred α,β-unsaturated carboxylic acids including acrylic acid and methacrylic acid. Suitable α,β-unsaturated carboxylic acid esters include lower alkyl esters, such as methyl ester, ethyl ester, propyl ester, n-butyl ester and isobutyl ester, of suitable carboxylic acids, such as acrylic acid, methacrylic acid, fumaric acid, maleic acid, crotonic acid and the like. Illustrative examples of particular compounds include methyl methacrylate, ethyl methacrylate, propyl methacrylate, butyl methacrylate, methyl acrylate, ethyl acrylate, propyl acrylate and butyl acrylate. Preferred esters include acrylic acid esters and methacrylic acid esters.

The acid content of the polymer may contain anywhere from 1 to 30 percent by weight acid. In some instances, it is preferable to utilize a high acid copolymer. "High-acid" as used herein typically refers to a copolymer containing greater than 16 percent by weight acid, preferably from about 17 to about 25 weight percent acid, and more preferably about 20 weight percent acid.

Examples of such polymers that are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608, 5980 and 5990 series of ethylene-acrylic acid copolymers sold by The Dow Chemical Company, Midland, Mich.

Also included are the bimodal ethylene/carboxylic acid polymers as described in U.S. Pat. No. 6,562,906, which is incorporated herein by reference. These polymers comprise ethylene/α,β-ethylenically unsaturated $C_{3-8}$ carboxylic acid high copolymers, particularly ethylene (meth)acrylic acid copolymers and ethylene, alkyl (meth)acrylate, (meth)acrylic acid terpolymers, having molecular weights of about 80,000 to about 500,000 which are melt blended with ethylene/α,β-ethylenically unsaturated $C_{3-8}$ carboxylic acid copolymers, particularly ethylene/(meth)acrylic acid copolymers having molecular weights of about 2,000 to about 30,000.

IV. Amino Triazines

Amino triazines can be used in combination with at least one ionomer or ionomer precursor, certain suitable exemplary embodiments of which are disclosed above, and any such additional compounds that are now known or hereafter developed that are useful for making sporting equipment, particularly golf balls, according to the present disclosure. Triazines are compounds comprising a heterocyclic ring having carbon atoms replaced with nitrogen atoms. Triazines typically are analogous to six-membered rings with three carbons replaced by nitrogen atoms. Triazines may be distinguished from each other by the positions of the nitrogen atoms, and are referred to as 1,2,3-triazine, 1,2,4-triazine, and 1,3,5-triazine. All such triazines are within the scope of the present invention, but are particularly exemplified herein by reference to 1,3,5-triazine derivatives.

Suitable amino triazines are exemplified by guanamine and guanamine derivatives. Guanamine has the following chemical formula:

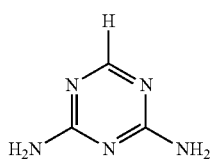

However, a person of ordinary skill in the art will appreciate that other amino triazines can be used to practice embodiments of the present invention, such as for making golf balls. For example, additional suitable amino triazines have the following formula:

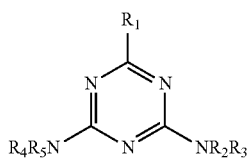

With reference to this general formula, $R_1$-$R_5$ typically are independently selected from aliphatic, particularly alkyl, and even more particularly lower (10 carbon atoms or fewer) alkyl, alkoxy, particularly lower alkoxy, substituted aliphatic, amine, aryl, such as phenyl, substituted aryl, halogen, heteroaryl, substituted heteroaryl, halogen, and hydrogen. Most typically, $R_1$ is lower alkyl, aryl, such as phenyl, substituted phenyl, or hydrogen, whereas $R_2$-$R_5$ most typically independently are hydrogen or lower alkyl. Certain of these compounds are commercially available, such as 6-methyl-1,3,5-triazine-2,4-diamine(acetoguanamine),

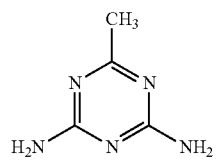

6-nonyl-1,3,5-triazine-2,4-diamine(nonylguanamine),

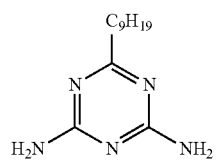

and 6-phenyl-1,3,5-triazine-2,4-diamine(benzoguanamine).

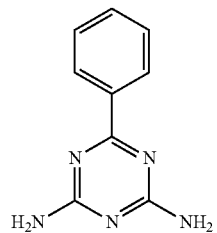 [SMILES: Nc1nc(N)nc(-c2ccccc2)n1]

A person of ordinary skill in the art will appreciate that the R groups may be substituted. For example, aliphatic side chains, typically alkyl side chains, may be substituted, such as with halogens. Moreover, the phenyl ring of benzoguanamine derivatives too can be substituted, as indicated below:

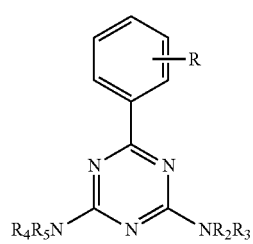

R typically is independently selected from aliphatic, typically lower alkyl, substituted aliphatic, amine, aryl, substituted aryl, heteroaryl, substituted heteroaryl, halogen and hydrogen, and $R_2$-$R_5$ are as stated above.

V. Addition of Triazines to Ionomer or Ionomer Precursors

Amino triazines advantageously can be used to change the properties of ionomer or ionomer precursor compositions. For example, hardness and/or flexural modulus can be increased, while substantially maintaining beneficial processing characteristics, such as material flow. Without being bound by a theory of operation, effective amounts of amino triazines may interact with ionomer or ionomer precursors as exemplified below with particular reference to carboxylic acid or carboxylate-containing ionomers and 1,3,5-amino triazines. With reference to the amino triazines, $R_1$-$R_5$ are as stated above.

As a first possibility, the amino triazines may react with at least a portion of available acid functional groups, such as carboxyl or carboxylate functional groups, provided by an ionomer or ionomer precursor to form at least one amide, as illustrated below, where $R_5$ is hydrogen.

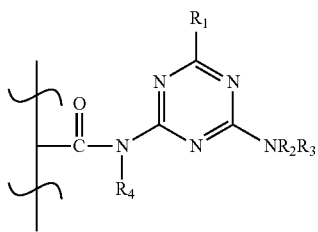

A person of ordinary skill in the art will appreciate that the amine nitrogen typically will include at least one hydrogen atom to facilitate reaction with the carboxylic acid functional group to form the amide. It also may be possible to deprotonate the amine prior to formation of the amide, such as by reacting a deprotonated amine with an ester or other protected form of the carboxylic acid. A person of ordinary skill in the art will also appreciate that if $R_2$-$R_3$ are the same as $R_4$-$R_5$ that the reaction to form the amide may occur at either nitrogen atom, or both, with substantially equal probability. Reaction also can occur at either amine nitrogen atom, or both, even if the R groups are not identical, although reaction at one amine nitrogen atom might be favored or disfavored depending on the nature of the substituents coupled to the amine nitrogen atoms, or to the triazine ring directly. For example, electron donating groups, either attached directly to an amine nitrogen atom, or alternatively to the triazine ring, such as at $R_1$, may increase nucleophilicity, and hence favor amide formation. Conversely, electron withdrawing groups attached either directly to an amine nitrogen atom, or alternatively to the triazine ring, such as at $R_1$, may decrease nucleophilicity, and hence disfavor amide formation or decrease the rate of amide formation.

Other reaction products also are possible. For example, the amino triazines may react with at least a portion of available acid functional groups, such as carboxyl or carboxylate functional groups, provided by an ionomer or ionomer precursor to form a salt compound, as indicated below.

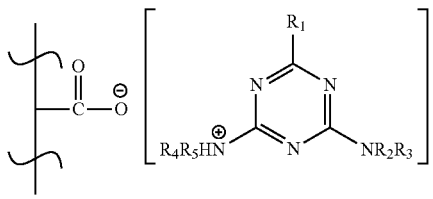

As discussed with reference to amide formation, a person of ordinary skill in the art will appreciate that either of the amine nitrogen atoms, or both, can be the atom protonated during salt formation. If $R_2$-$R_3$ are the same as $R_4$-$R_5$, salt formation may occur at either nitrogen atom, or both, with substantially equal probability. Salt formation also can occur at either amine nitrogen atom, or both, even if the R groups are not the same, although salt formation involving one amine nitrogen atom might be favored or disfavored depending on the nature of the substituents coupled to the amine nitrogen atoms, or to the triazine ring directly.

As another possibility, the amino triazines may react with at least a portion of available acid functional groups, such as carboxyl or carboxylate functional groups, provided by two ionomer or ionomer precursor compounds to effectively cross link such compounds, as indicated below, where $R_3$ and $R_5$ are most likely hydrogen.

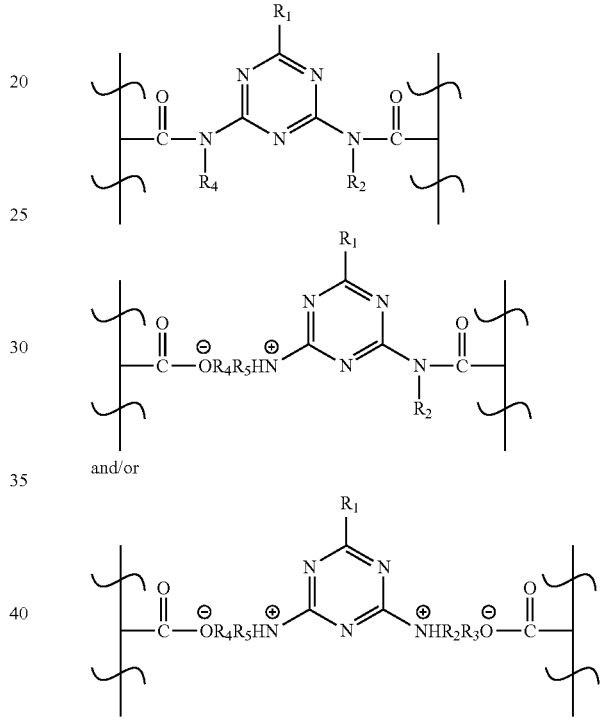

and/or

VI. Additional Polymeric and Non-Polymeric Materials Useful for Making Sports Equipment Ionomer or ionomer precursor compositions comprising amino triazines can be used to make one or more components of a golf ball. A person of ordinary skill in the art will understand that the golf ball component comprising the ionomer or ionomer precursor compositions that further comprise amino triazines can be combined with other polymeric materials, or other non-polymeric materials, as desired to make a suitable golf ball. Moreover, other components of disclosed golf ball embodiments can be made without the ionomer or ionomer precursor compositions that further comprise amino triazines, as long as at least one component of the golf ball does include such materials. While certain materials are disclosed below that are useful for making golf balls, additional materials are disclosed in Taylor Made's U.S. patent application Ser. No. 11/685,335, which is incorporated herein by reference.

The following polymeric materials are provided solely as examples of materials useful for forming golf ball cores, intermediate layers, and/or cover layers. These materials can be used in combination with the disclosed compositions to provide a desired composition. Alternatively, the following materials, or precursors thereto, can be used to make one or more golf ball components that do not include the disclosed compositions, but where at least one ball component does include at least one disclosed composition. A person of ordinary skill in the art will recognize that the present invention is not limited solely to those materials listed herein by way of example. Moreover, a person of ordinary skill in the art also will recognize that various combinations of such materials can be used to form golf ball components, such as the core, intermediate layer(s) and/or outer cover layer.

Additional guidance for selecting materials useful for making golf balls according to the disclosed embodiments is provided by considering those physical properties desirable for making golf balls. In addition to the exemplary list of materials provided herein, a person of ordinary skill in the art might consider compression, hardness, density, flexural modulus, elasticity, COR, impact durability, tensile properties, melt flow index, acoustic behavior, compatibility, processability, etc., in view of values stated herein for such properties, values that are typical in the field, or values that otherwise would be known to a person of ordinary skill in the field.

A. General Description of Polymeric Materials

Polymeric materials generally considered useful for making golf balls according to the process of the present invention include, without limitation, synthetic and natural rubbers, thermoset polymers such as thermoset polyurethanes and thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

Additional examples of particular polymeric materials useful for making golf ball cores, optional intermediate layer(s) and outer covers, again without limitation, are provided below.

B. Synthetic and Natural Rubbers

Traditional rubber components used in golf ball applications can be used to make golf balls according to the present invention including, without limitation, both natural and synthetic rubbers, such as polyalkenamers, cis-1,4-polybutadienes, trans-1,4-polybutadienes, 1,2-polybutadienes, cis-polyisoprenes, trans-polyisoprenes, polychloroprenes, polybutylenes, styrene-butadiene rubbers, styrene-butadiene-styrene block copolymers and partially and fully hydrogenated equivalents, styrene-isoprene-styrene block copolymers and partially and fully hydrogenated equivalents, nitrile rubbers, silicone rubbers, and polyurethanes, as well as mixtures of these materials. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be purchased, if commercially available, or synthesized by methods now known or hereafter developed, including using rare earth-based catalysts, nickel-based catalysts, or cobalt-based catalysts, that conventionally are used in this field. Polybutadiene obtained by using lanthanum rare earth-based catalysts usually employ a combination of a lanthanum rare earth (atomic number of 57 to 71) compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, and most preferably from about 2.2 to about 3.2. The polybutadiene rubbers have a Mooney viscosity ($ML_{1+4}$ (100° C.)) of from about −10 to about 80, preferably from about 20 to about 70, even more preferably from about 30 to about 60, and most preferably from about 35 to about 50. "Mooney viscosity" refers to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the present invention, are atactic 1,2-polybutadienes, isotactic 1,2-polybutadienes, and syndiotactic 1,2-polybutadienes. Syndiotactic 1,2-polybutadienes having crystallinity suitable for use as an unsaturated polymer in compositions within the scope of the present invention are polymerized from a 1,2-addition of butadiene. Golf balls within the scope of the present invention include syndiotactic 1,2-polybutadienes having crystallinity and greater than about 70% of 1,2-bonds, more preferably greater than about 80% of 1,2-bonds, and most preferably greater than about 90% of 1,2-bonds. Also, golf balls within the scope of the present invention not only have such crystallinity but also have a mean molecular weight of between from about 10,000 to about 350,000, more preferably between from about 50,000 to about 300,000, more preferably between from about 80,000 to about 200,000, and most preferably between from about 10,000 to about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

Also preferred are the polyalkenamer rubbers suitable examples of which are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Degussa AG of Dusseldorf, Germany, and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer for use in the practice of the invention has a trans content of approximately 80%; however, compounds having other ratios of the cis- and trans-isomeric forms of the polyalkenamer also can be obtained by blending available products for use in the invention.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5% to about 70%, preferably from about 6% to about 50%, more preferably from about from 6.5% to about 50%, even more preferably from about from 7% to about 45%.

More preferably, the polyalkenamer rubber used in the present invention is a polymer prepared by polymerization of cyclooctene to form a trans-polyoctenamer rubber as a mixture of linear and cyclic macromolecules.

Prior to its use in the golf balls of the present invention, the synthetic or natural rubber may be further formulated with one or more of the following blend components:

1. Cross-Linking Agents

Any crosslinking or curing system typically used for rubber crosslinking may be used to crosslink the rubber used in the present invention. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl) benzene; t-butylperoxybenzoate; 2,5-dimethyl-2,5-di-(t-butylperoxy)hexyne-3, such as Trigonox 145-45B, marketed by Akzo Nobel Polymer Chemicals of Chicago, Ill.; 1,1-bis (t-butylperoxy)-3,3,5 tri-methylcyclohexane, such as Varox 231-XL, marketed by R.T. Vanderbilt Co., Inc., of Norwalk, Conn.; and di-(2,4-dichlorobenzoyl)peroxide.

The cross-linking agents are blended with the polymeric rubber material in effective amounts, which typically vary in total amounts of from about 0.05 part to about 5 parts, more preferably about 0.2 part to about 3 parts, and most preferably about 0.2 part to about 2 parts, by weight of the cross-linking agents per 100 parts by weight of the polymeric rubber material.

Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the polymeric rubber composition to radiation also can serve as a cross-linking agent. Radiation can be applied to the polymeric rubber material mixture by any known method, including using microwave or gamma radiation, or an electron beam device. Additives may also be used to improve radiation-induced crosslinking of the polymeric rubber material.

2. Co-Cross-Linking Agent

The polymeric rubber material may also be blended with a co-cross-linking agent, which may be a metal salt of an unsaturated carboxylic acid. Examples of these include zinc and magnesium salts of unsaturated fatty acids having from about 3 to about 8 carbon atoms, such as acrylic acid, methacrylic acid, maleic acid, fumaric acid and palmitic acid, with the zinc salts of acrylic and methacrylic acid being preferred, and with zinc diacrylate being most preferred. The unsaturated carboxylic acid metal salt can be blended in the polymeric rubber material either as a preformed metal salt, or by introducing an α,β-unsaturated carboxylic acid and a metal oxide or hydroxide into the polyalkenamer rubber composition, and allowing them to react to form the metal salt. The unsaturated carboxylic acid metal salt can be blended in any desired amount, but preferably in amounts of about 10 parts to about 100 parts by weight of the unsaturated carboxylic acid per 100 parts by weight of the polyalkenamer rubber.

3. Accelerators

The polymeric rubber composition also can comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13*th* Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polymeric rubber material composition can further incorporate from about 0.1 part to about 10 parts by weight of the accelerator per 100 parts by weight of the polymeric rubber material. More preferably, the ball composition can further incorporate from about 0.2 part to about 5 parts, and most preferably from about 0.5 part to about 1.5 parts, by weight of the accelerator per 100 parts by weight of the polymeric rubber material.

C. Thermoplastic Materials

1. Olefinic Thermoplastic Elastomers

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISTAFLEX, VISTAMAXX 3000, VYRAM by Advanced Elastomeric Systems of Houston, Tex., and SARLINK by DSM of Haarlen, the Netherlands.

2. Co-Polyester Thermoplastic Elastomers

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

3. Other Thermoplastic Elastomers

Examples of other thermoplastic elastomers include multi-block, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block. Examples of styrenic copolymers include, without limitation, resins manufactured by Kraton Polymers (formerly of Shell Chemicals) under the trade names KRATON D (for styrene-butadiene-styrene and styrene-isoprene-styrene types), and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corporation.

Examples of other thermoplastic elastomers suitable as additional polymer components in the present invention include those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

4. Polyamides

Examples of polyamides within the scope of the present invention include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine, and any combination of those Specific examples of suitable polyamides include polyamide 6; polyamide 11; polyamide 12; polyamide 4,6; polyamide 6,6; polyamide 6,9; polyamide 6,10; polyamide 6,12; PA12CX; PA12, IT; PPA; PA6, IT.

Non-limiting examples of suitable polyamides or copolymeric polyamides for use in the inner mantle and/or the outer mantle layer include those sold under the trademarks PEBAX, CRISTAMID and RILSAN marketed by ATOFINA Chemicals of Philadelphia, Pa.; GRILAMID marketed by EMS CHEMIE of Sumter, S.C.; TROGAMID marketed by Degussa of Dusseldorf, Germany; and ZYTEL marketed by E.I. DuPont de Nemours & Co. of Wilmington, Del.

5. Polyamide Elastomer

Examples of polyamide elastomers within the scope of the present invention include polyether amide elastomers, which result from the copolycondensation of polyamide blocks having reactive chain ends with polyether blocks having reactive chain ends, including: 1) polyamide blocks of diamine chain ends with polyoxyalkylene sequences of dicarboxylic chain ends; 2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and 3) polyamide blocks of dicarboxylic chain ends with polyether diols, the products obtained, in this particular case, being polyetheresteramides.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences preferably is between about 300 and about 15,000, and more preferably between about 600 and about 5,000. The molecular weight of the polyether sequences preferably is between about 100 and about 6,000, and more preferably between about 200 and about 3,000.

The amide block polyethers also may comprise randomly distributed units. These polymers may be prepared by the simultaneous reaction of polyether and precursor of polyamide blocks.

For example, the polyether diol may react with a lactam (or alpha-omega amino acid) and a diacid which limits the chain in the presence of water. A polymer is obtained having mainly polyether blocks, polyamide blocks of very variable length, but also the various reactive groups having reacted in a random manner and which are distributed statistically along the polymer chain.

Suitable amide block polyethers include, without limitation, those disclosed in U.S. Pat. Nos. 4,331,786, 4,115,475, 4,195,015, 4,839,441, 4,864,014, 4,230,838, and 4,332,920, which are incorporated herein in their entireties by reference. The polyether may be, for example, a polyethylene glycol (PEG), a polypropylene glycol (PPG), or a polytetramethylene glycol (PTMG), also designated as polytetrahydrofurane (PTHF).

The polyether blocks may be along the polymer chain in the form of dials or diamines. However, for reasons of simplification, they are designated PEG blocks, or PPG blocks, or also PTMG blocks.

It is also within the scope of the disclosed embodiments that the polyether block comprises different units such as units, which derive from ethylene glycol, propylene glycol, or tetramethylene glycol.

The amide block polyether comprises at least one type of polyamide block and one type of polyether block. Mixing two or more polymers with polyamide blocks and polyether blocks also may be used. It also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of about 1:1 to about 3:1.

One type of polyetherester elastomer is the family of Pebax, which are available from Elf-Atochem Company. Preferably, the choice can be made from among Pebax 2533, 3533, 4033, 1205, 7033, and 7233. Blends or combinations of Pebax 2533, 3533, 4033, 1205, 7033, and 7233 also can be prepared, as well. Pebax 2533 has a hardness of about 25 shore D (according to ASTM D-2240), a Flexural Modulus of about 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of about 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of about 67 kpsi (according to ASTM D-790). Pebax 7333 has a hardness of about 72 shore D (according to ASTM D-2240) and a Flexural Modulus of about 107 kpsi (according to ASTM D-790).

Specific examples of suitable polyamides also include Nylon 6, Nylon 66, Nylon 610, Nylon 11, Nylon 12, copolymerized Nylon, Nylon MXD6, and Nylon 46.

6. Polyurethanes and Polyureas

Another example of an additional polymer component includes polyurethanes (the reaction product of a diol or polyol and an isocyanate) and polyureas (the reaction product of a diamine or polyamine and an isocyanate). For thermoplastic polyurethanes or polyureas, chain extenders may be added to control the final physical properties of a particular composition. Polyurethanes are described in the patent literature, and some are known for use in making golf ball cores. See, for example, Vedula et al., U.S. Pat. No. 5,959,059.

Isocyanates used for making polyurethanes or polyureas for use in the present invention encompass diisocyanates and polyisocyanates Useful isocyanates include aliphatic, arylaliphatic, alicyclic and aromatic isocyanates. The isocyanate content of such compounds can vary, but typically is greater than about 20%, more typically greater than about 25%, even more typically from about 25% to about 35%, and preferably from about 29% to about 34%.

Examples of suitable isocyanates include, but are not limited to, the following: trimethylene diisocyanates; tetramethylene diisocyanates; pentamethylene diisocyanates; hexamethylene diisocyanates; ethylene diisocyanates; diethylidene diisocyanates; propylene diisocyanates; butylene diisocyanates; bitolylene diisocyanates; tolidine isocyanates; isophorone diisocyanates; dimeryl diisocyanates; dodecane-1,12-diisocyanates; 1,10-decamethylene diisocyanates; cyclohexylene-1,2-diisocyanates; 1-chlorobenzene-2,4-diisocyanates; furfurylidene diisocyanates; 2,4,4-trimethyl hexamethylene diisocyanates; 2,2,4-trimethyl hexamethylene diisocyanates; dodecamethylene diisocyanates; 1,3-cyclopentane diisocyanates; 1,3-cyclohexane diisocyanates; 1,3-cyclobutane diisocyanates; 1,4-cyclohexane diisocyanates; 4,4'-methylenebis(cyclohexyl isocyanates); 4,4'-methylenebis(phenyl isocyanates); 1-methyl-2,4-cyclohexane diisocyanates; 1-methyl-2,6-cyclohexane diisocyanates; 1,3-bis (isocyanato-methyl)cyclohexanes; 1,6-diisocyanato-2,2,4,4-tetra-methylhexanes; 1,6-diisocyanato-2,4,4-tetra-trimethylhexanes; trans-cyclohexane-1,4-diisocyanates; 3-isocyanato-methyl-3,5,5-trimethylcyclohexyl isocyanates; 1-isocyanato-3,3,5-trimethyl-5-isocyanatomethylcyclohexanes; cyclohexyl isocyanates; dicyclohexylmethane 4,4'-diisocyanates; 1,4-bis(isocyanatomethyl)cyclohexanes; m-phenylene diisocyanate; m-xylylene diisocyanate; m-tetramethylxylylene diisocyanates; p-phenylene diisocyanate; p,p'-biphenyl diisocyanates; 3,3'-dimethyl-4,4'-biphenylene diisocyanates; 3,3'-dimethoxy-4,4'-biphenylene diisocyanates; 3,3'-diphenyl-4,4'-biphenylene diisocyanates; 4,4'-biphenylene diisocyanates; 3,3'-dichloro-4,4'-biphenylene diisocyanates; 1,5-naphthalene diisocyanates; 4-chloro-1,3-phenylene diisocyanates; 1,5-tetrahydronaphthalene diisocyanates; meta-xylene diisocyanates; 1,3-xylene diisocyanate; 2, 4 or 2,6-toluene diisocyanates; 2,4'-diphenylmethane diisocyanates; 2,4-chlorophenylene diisocyanates; p,p'-perhydrodiphenylmethane-2,4'-diisocyanate; perhydrodiphenylmethane-4,4'-diisocyanate; hexahydrophenylene-1,3-diisocyanate; hexahydrophenylene-1,4-diisocyanate; 4,4'-diphenylmethane diisocyanates; p,p'-diphenylmethane diisocyanate; 2,4-tolylene diisocyanates; 2,6-tolylene diisocyanates; 2,2-diphenylpropane-4,4'-diisocyanate; 4,4'-toluidine diisocyanates; dianisidine diisocyanates; 4,4'-diphenyl ether diisocyanates; 1,3-xylylene diisocyanates; 1,4-naphthylene diisocyanates; azobenzene-4,4'-diisocyanates; diphenyl sulfone-4,4'-diisocyanates; triphenylmethane 4,4',4"-triisocyanates; isocyanatoethyl methacrylates; 3-isopropenyl-α,α-dimethylbenzyl-isocyanates; dichlorohexamethylene diisocyanates; ω,ω'-diisocyanato-1,4-diethylbenzenes; polymethylene polyphenylene polyisocyanates; polybutylene diisocyanates; arylaliphatic diisocyanates such as perchlorinated aryl polyisocyanates; polyphenylpolymethylene polyisocyanates obtained by aniline formaldehyde condensation followed by phosgenation; m- and p-isocyanatophenyl-sulphonyl isocyanates; and isocyanurate-, carbodiimide and biuret modified compounds of the above polyisocyanates. Each isocyanate may be used either alone or in combination with one or more other isocyanates.

Polyols used for making the polyurethane include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), polypropylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyols may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), p-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which has an active hydrogen. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture.

Polycarbonate polyols are obtained by the condensation of a known polyol (polyhydric alcohol) with phosgene, chloroformic acid ester, dialkyl carbonate or diallyl carbonate. A particularly preferred polycarbonate polyol contains a polyol component using 1,6-hexanediol, 1,4-butanediol, 1,3-butanediol, neopentylglycol or 1,5-pentanediol. A polycarbonate polyol can be used either alone or in a mixture.

Polybutadiene polyols include liquid diene polymer containing hydroxyl groups, and an average of at least 1.7 functional groups, and may be composed of diene polymers or diene copolymers having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture.

Thermoplastic polyurethanes or polyureas used to practice the present invention also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Suitable polyamines that may be used as chain extenders include primary, secondary and tertiary amines. Polyamines have two or more amine functional groups. Examples of polyamines include, without limitation: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, dimethylthio-2,4-toluene diamine, diethyl-2,4-toluene diamine, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl)phenol, 4,4'''-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine; 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,T,3,3'-tetrachloro-4,4'-diamino-phenyl methane, p,p'-methylenedianiline, p-phenylenediamine or 4,4'-diaminodiphenyl; and 2,4,6-tris(dimethylaminomethyl)phenol; and any and all combinations thereof. Further examples include ethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-(bispropylamine); monoethanolamine, diethanolamine; triethanolamine; monoisopropanolamine, diisopropanolamine; isophoronediamine; and mixtures thereof.

A chain extender may be used either alone or in a mixture.

Thermoset polyurethanes or polyureas used to practice the present invention also incorporate curing agents. Depending on their chemical structure, curing agents may be slow- or fast-reacting polyamines or polyols. As described in U.S. Pat. Nos. 6,793,864, 6,719,646 and copending U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity of the polyamines.

Suitable curatives for use in the present invention that are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

When slow-reacting polyamines are used as the curing agent to produce urethane elastomers, a catalyst is typically needed to promote the reaction between the urethane prepolymer and the curing agent. Specific suitable catalysts include TEDA dissolved in di propylene glycol (such as TEDA L33 available from Witco Corp. Greenwich, Conn., and DABCO 33 LV available from Air Products and Chemicals Inc.,) which may be added in amounts of 2-5%, and more preferably TEDA dissolved in 1,4-butane diol which may be added in amounts of 2-5%. Another suitable catalyst includes a blend of 0.5% 33LV or TEDA L33 (above) with 0.1% dibutyl tin dilaurate (available from Witco Corp. or Air Products and Chemicals, Inc.) which is added to a curative such as VIBRA-CURE® A250. Unfortunately, as is well known in the art, the use of a catalyst can have a significant effect on the ability to control the reaction and thus, on the overall processability.

To eliminate the need for a catalyst, a fast-reacting curing agent can be used which do not have electron withdrawing groups or bulky groups that interfere with the reaction groups. However, the lack of control associated with using catalysts is not completely eliminated since fast-reacting curing agents are also relatively difficult to control.

A preferred curing agent blend includes the use of fast curing agents such as diethyl-2,4-toluenediamine, 4,4'''-methylene-bis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine and Curalon L, a trade name for a mixture of aromatic diamines sold by Uniroyal, Inc. or any and all combinations thereof. A preferred fast-reacting curing agent is diethyl-2,4-toluene diamine, which has two commercial grades names, Ethacure® 100 and Ethacure® 100LC, a commercial grade having lower color and less by-product. In other words, it is considered a cleaner product to those skilled in the art.

If a post curable composition is required the chain extender or curing agent can further comprise a peroxide or peroxide mixture. Before the composition is exposed to sufficient thermal energy to reach the activation temperature of the peroxide, the composition of (a) and (b) behaves as a thermoplastic material. Therefore, it can readily be formed into golf ball layers using injection molding. However, when sufficient thermal energy is applied to bring the composition above the peroxide activation temperature, crosslinking occurs, and the thermoplastic polyurethane is converted into crosslinked polyurethane.

Examples of suitable peroxides for use in compositions within the scope of the present invention include aliphatic peroxides, aromatic peroxides, cyclic peroxides, or mixtures of these. Primary, secondary, or tertiary peroxides can be used, with tertiary peroxides most preferred. Also, peroxides containing more than one peroxy group can be used, such as 2,5-bis-(ter.butylperoxy)-2,5-dimethyl hexane and 1,4-bis-(tert-butylperoxy-isopropyl)-benzene. Also, peroxides that are either symmetrical or asymmetric can be used, such as tert-butylperbenzoate and tert-butylcumylperoxide. Additionally, peroxides having carboxy groups also can be used. Decomposition of peroxides used in compositions within the scope of the present invention can be induced by applying thermal energy, shear, reactions with other chemical ingredients, or a combination of these. Homolytically decomposed peroxide, heterolytically decomposed peroxide, or a mixture thereof, can be used to promote crosslinking reactions in compositions within the scope of this invention. Examples of suitable aliphatic peroxides and aromatic peroxides, include diacetylperoxide, di-tert-butylperoxide, dibenzoylperoxide, dicumylperoxide, 2,5-bis-(t-butylperoxy)-2,5-dimethyl hexane, 2,5-dimethyl-2,5-di(benzoylperoxy)hexane, 2,5-dimethyl-2,5-di(butylperoxy)-3-hexyne, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl). Peroxides for use within the scope of this invention may be acquired from Akzo Nobel Polymer Chemicals of Chicago, Ill., Atofina of Philadelphia, Pa. and Akrochem of Akron, Ohio. Further details of this post curable system are disclosed in U.S. Pat. No. 6,924,337, which is incorporated herein by reference.

7. Ethylenically Unsaturated Thermoplastic Elastomers

Another family of thermoplastic elastomers for use in the golf balls of the present invention are polymers of (i) ethylene and/or an alpha olefin; and (ii) an $\alpha,\beta$-ethylenically unsaturated $C_3$-$C_{20}$ carboxylic acid or anhydride, or an $\alpha,\beta$-ethylenically unsaturated $C_3$-$C_{20}$ sulfonic acid or anhydride or an $\alpha,\beta$-ethylenically unsaturated $C_3$-$C_{20}$ phosphoric acid or anhydride and, optionally iii) a $C_1$-$C_{10}$ ester of an $\alpha,\beta$-ethylenically unsaturated $C_3$-$C_{20}$ carboxylic acid or a $C_1$-$C_{10}$ ester of an $\alpha,\beta$-ethylenically unsaturated $C_3$-$C_{20}$ sulfonic acid or a $C_1$-$C_{10}$ ester of an $\alpha,\beta$-ethylenically unsaturated $C_3$-$C_{20}$ phosphoric acid.

Preferably, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid and methacrylic acid being preferred. Preferably, the carboxylic acid ester of if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of such polymers suitable for use include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl (meth)acrylate terpolymers, or ethylene and/or propylene maleic anhydride copolymers and terpolymers.

The acid content of the polymer may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311 and 4608 series of ethylene-acrylic acid copolymers sold by The Dow Chemical Company, Midland, Mich.

Also included are the bimodal ethylene/carboxylic acid polymers as described in U.S. Pat. No. 6,562,906, the entire contents of which are herein incorporated by reference. These polymers comprise ethylene/$\alpha,\beta$-ethylenically unsaturated $C_{3-8}$ carboxylic acid high copolymers, particularly ethylene (meth)acrylic acid copolymers and ethylene, alkyl (meth) acrylate, (meth)acrylic acid terpolymers, having molecular weights of about 80,000 to about 500,000 which are melt blended with ethylene/$\alpha/\beta$-ethylenically unsaturated $C_{3-8}$ carboxylic acid copolymers, particularly ethylene/(meth) acrylic acid copolymers having molecular weights of about 2,000 to about 30,000.

8. Silicone Materials

Silicone materials also are well suited for blending into compositions within the scope of the present invention. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsil-oxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

9. Miscellaneous Copolymers

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

An especially preferred additional polymeric for use as in the present invention comprises a blend of one or more of the ionomers, and aforementioned thermoplastic elastomers comprising a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan.

One embodiment of a method for making a polymer blend composition comprises blending together a) at least one component A that is a monomer, oligomer, prepolymer, or polymer comprising at least 5 percent by weight of anionic functional groups selected from the group consisting of sulfonic acid, phosphoric acid, and carboxylic acid; b) at least one component B that is a monomer, oligomer, prepolymer, or polymer comprising less by weight of anionic functional groups than the weight percentage of anionic functional groups of the at least one component A; and c) at least one component C that is a metal cation, to form a first composition. Blending may comprise dry-mixing together the at least one component A and the at least one component B to produce a first mixture, melt-mixing the first mixture, and adding into the first mixture the at least one component C to form the first composition. The first composition is melt processed to produce a reaction product of the anionic functional groups of the at least one component A and the at least one component C to form the polymer blend composition. Preferably melt-mixing the first mixture occurs in an extruder and component C is added using a side-feeder coupled to the extruder. Further details of this system are disclosed in U.S. Pat. No. 6,930,150, incorporated herein by reference.

VII. Filler

The compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly from about 1 nanometer (nm) thick and from about 100 to about 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer, such as the polyalkenamer rubber, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

For the polyalkenamers, the nanofiller material is added in an amount of from about 0.1% to about 20%, preferably from about 0.1% to about 15%, and most preferably from about 0.1% to about 10% by weight of nanofiller reacted into and substantially dispersed through intercalation or exfoliation into the structure of the polyalkenamer.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

Another particularly well-suited additive for use in the compositions of the present invention includes compounds having the general formula:

$$(R_2N)_m—R'—(X(O)_nOR_y)_m,$$

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. patent application Ser. No. 11/182,170, filed on Jul. 14, 2005, the entire contents of which are incorporated herein by reference. These materials include, without limitation, caprolactam, oenantholactam, decanolactam, undecanolactam, dodecanolactam, caproic 6-amino acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid., 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine)carbamate and ammonium carbamate.

Most preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoicacid, 12-aminododecanoic acid, epsilon-caprolactam; omega-caprolactam, and any and all combinations thereof.

In an especially preferred embodiment a nanofiller additive component in the golf ball of the present invention is surface modified with a compatibilizing agent comprising the earlier described compounds having the general formula:

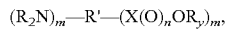

A most preferred embodiment would be a filler comprising a nanofiller clay material surface modified with an amino acid including 12-aminododecanoic acid. Such fillers are available from Nanonocor Co. under the tradename Nanomer 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

VIII. Miscellaneous Additives

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include colorants, pigments, including without limitation, thermochromic pigments, photochromic pigments, phosphorescent pigments, fluorescent pigments, laser energy enhancing pigments, UV stabilizers, photo stabilizers, antioxidants, colorants, dispersants, mold releasing agents, processing aids, fillers, and any and all combinations thereof.

IX. Method for Making Disclosed Compositions

The disclosed compositions can be made by any suitable mixing methods. The composition components, including any desired additives, can be mixed together by any suitable methods now known or hereafter developed to form golf balls, with or without melting. Dry blending equipment, such as a tumble mixer, V-blender, ribbon blender, or two-roll mill, can be used to mix the compositions. The golf ball compositions can be mixed using a mill, internal mixer, extruder or combinations of these, with or without application of thermal energy to produce melting. The composition can be prepared by any suitable process, such as single screw extrusion, twin-screw extrusion, banbury mixing, two-roll mill mixing, dry blending, by using a master batch, or any combination of these techniques. The resulting compositions can be processed by any method useful to form golf balls or golf ball preforms, such as extrusion (disclosed in detail in applicants' co-pending U.S. application Ser. No. 11/486,938, incorporated herein by reference) profile-extrusion, pultrusion, compression molding, transfer molding, injection molding, cold-runner molding, hot-runner molding, reaction injection molding or any combination thereof. The polymer/polymer modifier composition can be a blend that is not subjected to any further crosslinking or curing; a blend that is subjected to crosslinking or curing; a blend that forms a semi- or full-interpenetrating polymer network (IPN) upon crosslinking or curing; or a thermoplastic vulcanizate blend. The composition can be crosslinked by any crosslinking method(s), such as, for example, using chemical crosslinking agents, applying thermal energy, irradiation, or a combination thereof. The crosslinking reaction can be performed during any processing stage, such as extrusion, compression molding, transfer molding, injection molding, post-curing, or a combination thereof.

Where crosslinking agents are used, the compression and heat may liberate free radicals, such as by decomposing one or more peroxides, which initiate cross-linking. The temperature and duration of the molding cycle are selected based upon the type of crosslinking agent selected. The molding cycle may have a single molding step that is performed at a particularly suitable temperature for fixed time duration; the molding cycle may have plural molding steps at plural different suitable temperatures for fixed durations; the molding cycle may include one or more steps where the temperature is increased or decreased from an initial temperature during the molding step period; etc.

For example, one process for preparing golf ball cores comprising the disclosed compositions comprises first mixing various ingredients on a two-roll mill to form slugs of approximately 30-45 grams. The slugs are then compression molded in a single step at an effective temperature, typically between from about 150° C. to about 210° C., for an effective time period, which typically is between from about 2 to about 12 minutes.

Alternatively, the golf ball component may be formed by first injection molding the composition into a mold followed by a subsequent compression molding step to complete the curing step. The curing time and conditions in this step depend on the formulation of the composition used.

Alternatively, the component may be formed from a suitable composition in a single injection molding step in which the composition is injection molded into a heated mold at a sufficient temperature to yield the desired core properties. If the material is partially cured, additional compression molding and/or irradiation steps optionally may be used to complete the curing process and thereby yield the desired core properties.

Similarly in both intermediate layer(s) and outer cover formation, the use of disclosed compositions allows for considerable flexibility in the layer formation steps of golf ball construction. For instance, finished golf balls may be prepared by initially positioning a solid preformed core in an injection molding cavity followed by uniform injection of the intermediate or cover layer composition sequentially over the core to produce layers of the required thickness and ultimately golf balls of the required diameter. Again use of a heated injection mold allows the temperature to be controlled sufficiently to either partially or fully crosslink the material to yield desired layer properties. If the material is partially cured, additional compression molding or irradiation steps optionally may be employed to complete the curing process to yield the desired layer properties.

Alternatively, the intermediate and/or cover layers also may be formed around the core or intermediate layer by first forming half shells by injection molding disclosed compositions followed by a compression molding the half shells about the core or intermediate layer to cure the layers in the final ball.

Alternatively, intermediate and/or cover layers also may be formed around the core or intermediate layer by first forming half shells by injection molding the compositions again using a heated injection mold that allows sufficient temperature control to yield the desired half shell properties. The resulting half shells then may be compression molded around the core or core plus intermediate layer. Again, if the half shell is partially cured, the additional compression molding or irradiation steps optionally may be tailored to complete the curing process to yield the desired layer properties.

Finally, outer or intermediate covers comprising suitable compositions also may be formed around the cores using conventional compression molding techniques.

In addition, if radiation is used as a cross-linking agent, then other additives can be irradiated following mixing, during forming into a part such as the core, intermediate layer, or outer cover of a ball, or after forming such part.

A preferred method for making golf balls within the scope of the present invention involves injection molding a core, intermediate layer, or cover of the composition into a cold mold without inducing heavy cross-linking of the unsaturated polymer. The product from this process then is compression molded to induce partial or full cross-linking.

In another preferred method, injection molding is used to inject the composition around a core positioned in a mold, in which thermal energy is applied to induce cross-linking. In yet another preferred method, an intermediate layer or a cover of the unsaturated polymer, peptizer, and cross-linking agent can be prepared by injection molding the mixture as half shells. The half shells are then positioned around a core and compression molded. The heat and pressure first melt the composition to seal the two half shells together forming a complete layer. Additional thermal energy induces cross-linking of the unsaturated polymer.

In another preferred method, half shells of the disclosed compositions are prepared. The half shells are coated with the cross-linking agent and compression molded around a core to form a layer and to induce cross-linking. In another preferred method, a layer incorporating the disclosed composition is positioned around a core to form a layer. The layer then is coated with the cross-linking agent and compression molded to induce cross-linking. When used to form a cover layer, a preferred embodiment of the method involves preparing the cover layer using injection molding and forming dimples on the surface of the cover layer, while inducing full or partial cross-linking of the layer during injection molding. Alternately, the cover layer can be formed using injection molding without dimples, after which the cover layer is compression molded to form dimples and also induce full or partial cross-linking.

X. Examples

The following example is provided to illustrate particular features of working embodiments. The scope of the invention is not limited to these particular features.

Example 1

Exemplary compositions as indicated below in Table 1 were made by adding acetoguanamine and melamine to various ionomeric resins commercially available from E.I. DuPont de Nemours and Co., and sold under the trademark SURLYN®. According to Dupont Packaging & Industrial Polymer's website, accessed on Apr. 15, 2008, SURLYN® 9150 thermoplastic resin is an ethylene/methacrylic acid copolymer having methacrylic acid functional groups partially neutralized with zinc ions. SURLYN® 9150 has a high methacrylic acid content and mid-range neutralization level, which creates an exceptional combination of low-temperature toughness, tear resistance, excellent clarity, and high stiffness compared with other grades of SURLYN®. For golf ball covers, SURLYN® 9150 provides improved cut resistance and impact durability, increased resiliency and increased coefficient of restitution, particularly when used in blends with different cations. DuPont™ SURLYN® 9020 thermoplastic resin also is an ethylene/methacrylic acid (E/MAA) copolymer having the methacrylic acid functional groups partially neutralized with zinc ions. SURLYN® 9020, however, contains an additional co-monomer.

The compositions of Table 1 contained 100 parts by weight SURLYN® resin and the listed amounts by weight of either acetoguanamine or melamine. SURLYN® resins that did not include either acetoguanamine or melamine were used as controls.

Core or ball diameter was determined using standard linear calipers or a standard size gauge.

Compression was measured by applying a spring-loaded force to the sphere to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. The value is taken shortly after applying the force and within at least 5 seconds if possible. Compression measured with this instrument is also referred to as PGA compression.

The approximate relationship that exists between Atti or PGA compression and Riehle compression can be expressed as:

(Atti or PGA compression)=(160-Riehle Compression).

Thus, a Riehle compression of 100 would be the same as an Atti compression of 60.

The initial velocity of a golf ball after impact with a golf club is governed by the United States Golf Association ("USGA"). The USGA requires that a regulation golf ball can have an initial velocity of no more than 250 feet per second±2%, or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a completely elastic collision and 0 being equivalent to a completely inelastic collision. Since a ball's COR directly influences the ball's initial velocity after club collision and travel distance, golf ball manufacturers are interested in this characteristic for designing and testing golf balls.

Melt flow index (MFI) was measured in accordance with ASTM D-1238.

Tensile elongation and strength were measured in accordance with ASTM D-638.

Flexural modulus and strength were measured in accordance with ASTM D790.

TABLE 1

|  | A | A1 | A2 | B | B1 | B2 |
|---|---|---|---|---|---|---|
| S9150 | 100 | 100 | 100 |  |  |  |
| S9020 |  |  |  | 100 | 100 | 100 |
| Acetoguanamine |  | 5 |  |  | 1 | 3 |
| Melamine |  |  | 5 |  |  |  |
| MFI | >30 | >30 | >30 | 7.9 | 6.2 | 7.4 |
| TS (psi) | 3893 | 4149 | 3824 | 3113 | 3670 | 3680 |
| TE (%) | 157 | 223 | 185 | 215 | 172 | 160 |
| FS (psi) | 435 | 626 | 630 | 143 | 165 | 234 |
| FM (kpsi) | 52.3 | 77.6 | 73.3 | 16.5 | 19.3 | 27.2 |
| Shore D | 61 | 65 | 64 | 51 | 52 | 56 |

PGA compression, C.O.R., and Shore D hardness were conducted on materials and/or golf balls made according to the present disclosure using the test methods as defined below.

Shore D hardness was measured in accordance with ASTM D2240. Hardness of a layer was measured on the ball, perpendicular to a land area between the dimples.

Table 1 shows that incorporating amino triazines, such as acetoguanamine and melamine, into ionomer resins increases the Shore D hardness and flexural modulus significantly while maintaining the melt flow index.

Twenty four golf balls were prepared using a methacrylic-acid based ionomer having a Shore D hardness of about 60, as indicated below in Table 2. A first golf ball cover layer composition did not include any amino triazines, and hence functioned as a control. A second golf ball cover composition included 3 parts per hundred by weight of acetoguanamine. Golf balls made using these two compositions were then evaluated to determine various characteristics as indicated in Table 2.

TABLE 2

| | 60D Ionomer | |
|---|---|---|
| Cover Materials | | |
| Acetoguanamine | — | 3 pph |
| MFI @230 C. | 7.7 | 6.5 |
| Core Physicals | | |
| Size | 1.54" | |
| Compression | 40 | 40 |
| Ball Physicals | | |
| Shore D Hardness | 60.3 | 64.8 |
| Shear-cut resistance | 1.74 | 1.42 |
| Reference Balls | TP Red | Noodle+ |
| Shear-cut resistance | 1.47 | 2.34 |

The data in Table 2 shows that the addition of acetoguanamine decreased the melt flow index, which facilitates processing compositions comprising amino triazines, such as acetoguanamine. Furthermore, adding an amino triazine also increased the Shore D hardness, which is a positive benefit for a golf ball cover layer, and provided acceptable shear-cut resistance, comparable with the commercially available reference balls, the Taylor Made TP Red and Noodle®+.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for making a golf ball, comprising:
providing a composition comprising a fully neutralized, partially neutralized or non-neutralized ionomer polymer and an effective amount of an amino triazine that reacts with the ionomer polymer where, prior to any reaction with the ionomer polymer or an ionomer polymer precursor, the amino triazine has a formula

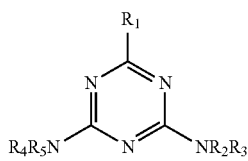

and where, subsequent to reaction with the ionomer polymer or ionomer polymer precursor, the ionomer polymer has a formula

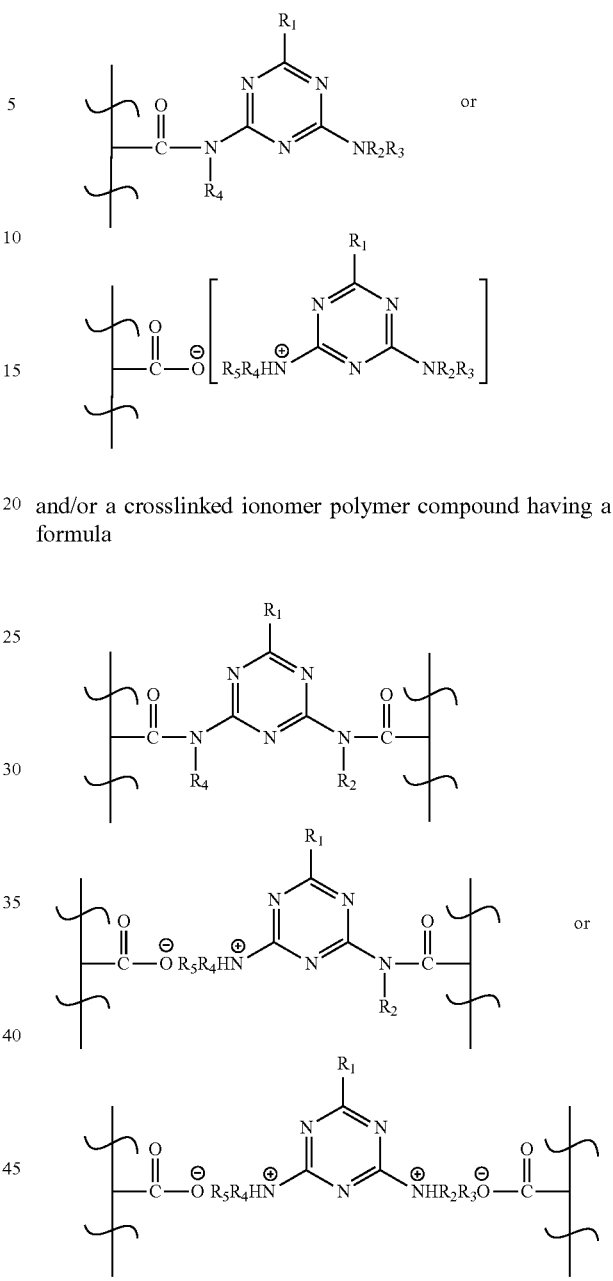

and/or a crosslinked ionomer polymer compound having a formula where $R_1$-$R_5$ are independently aliphatic, substituted aliphatic, alkoxy, amine, aryl, substituted aryl, heteroaryl, substituted heteroaryl, halogen or hydrogen; and
forming at least one layer of a golf ball comprising the composition.

2. The method according to claim 1 where the amino triazine is guanamine, 6-methyl-1,3,5-triazine-2,4-diamine (acetoguanamine), 6-nonyl-1,3,5-triazine-2,4-diamine (nonylguanamine), 6-phenyl-1,3,5-triazine-2,4-diamine (benzoguanamine), or 2,4,6-triamino-triazine (melamine).

3. The method according to claim 1 where the ionomer polymer or ionomer polymer precursor has plural reactive functional groups selected from an oxo acid of carbon, an oxo acid of sulfur, an oxo acid of phosphorous, or combinations thereof, and from about 5% to about 100% of the reactive functional groups react with the amino triazine compound.

4. The method according to claim 1 wherein the composition further comprises at least one filler, at least one nanofiller, or a mixture thereof.

5. The method according to claim 1 where the golf ball is a three-piece golf ball comprising a rubber-based core, at least one intermediate layer and an outer cover layer, at least one of the intermediate layer and outer cover layer comprising the partially neutralized or non-neutralized ionomer polymer.

6. The method according to claim 1 where the golf ball is a four-piece golf ball having a rubber-based core having a center, an inner intermediate layer, an outer intermediate layer, and a cover, at least one of the inner layer, outer intermediate layer or cover comprising the partially neutralized or non-neutralized ionomer polymer.

7. The method according to claim 1 where the golf ball comprises a core, an inner mantle layer, an intermediate mantle layer, an outer mantle layer, and at least one cover layer, and where at least the core or one of such layers comprises the partially neutralized or non-neutralized ionomer polymer.

8. The method according to claim 1 where the ionomer polymer or ionomer polymer precursor is partially or fully neutralized by an acetate, oxide or hydroxide metal salt.

9. The method according to claim 1 where the ionomer polymer or ionomer polymer precursor has plural reactive functional groups, and from about 5% to about 100% of the reactive functional groups react with the amino triazine compound.

* * * * *